(12) United States Patent
Yamada et al.

(10) Patent No.: US 12,260,719 B2
(45) Date of Patent: Mar. 25, 2025

(54) MONITORING DEVICE AND MONITORING SYSTEM

(71) Applicant: Panasonic Intellectual Property Management Co., Ltd., Osaka (JP)

(72) Inventors: Shin Yamada, Kanagawa (JP); Kazuhiko Iwai, Kanagawa (JP); Takeshi Watanabe, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/286,393

(22) PCT Filed: Mar. 25, 2022

(86) PCT No.: PCT/JP2022/014458
§ 371 (c)(1),
(2) Date: Oct. 11, 2023

(87) PCT Pub. No.: WO2022/220072
PCT Pub. Date: Oct. 20, 2022

(65) Prior Publication Data
US 2024/0203221 A1 Jun. 20, 2024

(30) Foreign Application Priority Data
Apr. 12, 2021 (JP) .................................. 2021-067354

(51) Int. Cl.
*G08B 13/196* (2006.01)
*G06V 20/52* (2022.01)
(52) U.S. Cl.
CPC ....... *G08B 13/19652* (2013.01); *G06V 20/52* (2022.01); *G08B 13/19613* (2013.01)
(58) Field of Classification Search
None
See application file for complete search history.

(56) References Cited

U.S. PATENT DOCUMENTS

| 5,095,365 A | 3/1992 | Takatoo et al. |
| 7,248,287 B1 | 7/2007 | Sogawa et al. |

(Continued)

FOREIGN PATENT DOCUMENTS

| CN | 110395271 A | * 11/2019 | ............... B61B 1/02 |
| CN | 114902070 A | * 8/2022 | ........ B60W 50/0205 |

(Continued)

OTHER PUBLICATIONS

International Search Report issued in International Bureau of WIPO Patent Application No. PCT/JP2022/014458, dated Jun. 14, 2022, along with an English translation thereof.

(Continued)

*Primary Examiner* — Ricky Chin
(74) *Attorney, Agent, or Firm* — GREENBLUM & BERNSTEIN, P.L.C.

(57) ABSTRACT

Provided is a monitoring system configured such that, even when there is a deviation of a shooting region of a camera, if the deviation is within an acceptable level, an accurate vehicle detection using a recognition model can be performed without readjusting parameters or re-training the model. Based on an image of a no-entry zone and a platform zone, a processor performs a first operation for detecting a person in the no-entry zone and a second operation for detecting a vehicle in the no-entry zone; and based on detection results, determines whether an alert needs to be issued. When there is a deviation of the shooting region of a camera, the processor performs a conversion operation for converting an image of a current shooting region to an image that would be captured by the camera with an original shooting region and uses the converted image for the two detection operations.

5 Claims, 10 Drawing Sheets

(56) References Cited

U.S. PATENT DOCUMENTS

| | | | |
|---|---|---|---|
| 7,800,688 B2 | 9/2010 | Sogawa et al. | |
| 8,508,657 B2 | 8/2013 | Sogawa et al. | |
| 10,440,290 B2 | 10/2019 | Kikuchi | |
| 11,450,079 B2 | 9/2022 | Usuda | |
| 11,978,550 B2 | 4/2024 | Usuda | |
| 2014/0379197 A1* | 12/2014 | Eckert | B60T 7/22 701/28 |
| 2023/0202533 A1* | 6/2023 | Nativ | E01C 15/00 104/28 |
| 2023/0271634 A1* | 8/2023 | Sève | B61B 7/00 702/34 |
| 2024/0203221 A1* | 6/2024 | Yamada | G06T 7/00 |
| 2024/0274274 A1 | 8/2024 | Usuda | |

FOREIGN PATENT DOCUMENTS

| | | | | |
|---|---|---|---|---|
| DE | 112011102294 T5 * | 5/2013 | | G06K 9/00335 |
| JP | H03-205999 A | 9/1991 | | |
| JP | 2001-091984 A | 4/2001 | | |
| JP | 2011-166243 A | 8/2011 | | |
| JP | 2013129300 A * | 7/2013 | | |
| JP | 5386744 B2 | 1/2014 | | |
| JP | 2017-185126 A | 10/2017 | | |
| JP | 2020-141995 A | 9/2020 | | |
| JP | 2022162473 A * | 10/2022 | | G06V 20/52 |
| JP | 7368180 B2 * | 10/2023 | | |
| JP | 7495315 B2 * | 6/2024 | | |
| KR | 20090074103 A * | 7/2009 | | |
| KR | 101989376 B1 * | 6/2019 | | |

OTHER PUBLICATIONS

Office Action dated Dec. 3, 2024, in related Japanese patent application No. 2021-067354, along with an English translation thereof.

* cited by examiner

MONITORING DEVICE AND MONITORING SYSTEM

TECHNICAL FIELD

The present invention relates to a monitoring device and a monitoring system configured to: acquire a camera image, an image shot by a camera, of a no-entry zone, in which vehicles can travel, and a platform zone, in which passengers can board and exit vehicles; and detect an intrusion of a person into the no-entry zone based on the camera image; and issue an alert of the person's intrusion.

BACKGROUND ART

At a railroad station, users sometimes fall off the platform to the tracks, and it is desirable to detect such a person's fall at an early stage so that necessary measures, such as an emergency stop operation and a rescue operation, can be promptly conducted. Monitoring systems which have been proposed for this purpose in recent years are generally configured to acquire a camera image of a platform and tracks, and based on the camera image, detect a person who has fallen off the platform to the tracks, and alert staff of the fall accident.

Known such monitoring systems include a system for detecting a person who has fallen off a platform based on a camera image of the platform and tracks along the platform, configured such that, when determining that a train is present on the tracks along the platform, the system stops conducting a detection operation in order to avoid a false detection of the train as a person who has fallen off the platforms (Patent Document 1).

PRIOR ART DOCUMENT(S)

Patent Document(s)

Patent Document 1: JP5386744B

SUMMARY OF THE INVENTION

Task to be Accomplished by the Invention

A deviation of a shooting region, a region which a camera can shoot, is caused due to various reasons. For example, a user's incorrect operation of a pan-tilt feature of a camera can cause such a deviation of the shooting region (shooting region deviation). A vibration caused by a passing train can cause a shooting region deviation. When a worker doing a cleaning or inspection task touches or contacts a camera, the shooting region can deviate from the original shooting region. For such reasons, a shooting region of a camera can deviate from an original shooting region, resulting in a change in a field of view of the camera.

Another known system uses a template matching operation to determine whether a train is present on the tracks along the platform based on a camera image (vehicle detection operation). Yet another known system performs a vehicle detection operation by using an image recognition model created through machine learning technology such as deep learning (a machine learning model).

In such a system in which an image recognition model is used in a vehicle detection operation, occurrence of a deviation of a shooting region of a camera results in a change in a field of view of the camera, which causes a significant decrease in accuracy of the vehicle detection operation. In this case, the accuracy of the train-presence determination can be recovered to a normal level by readjusting parameters of the image recognition model, or by collecting training data for the changed shooting region over a certain time and retraining the model with the collected data. In this way, the accuracy recovery requires troublesome tasks to be done, which is a problem of known systems using an image recognition model in a vehicle detection operation.

The present invention was made in view of such problems of the prior art, and has a primary object is to provide a monitoring device and a monitoring system configured such that, even when there is a deviation of a shooting region of a camera, if the deviation is within an acceptable level, an accurate vehicle detection using an image recognition model can be performed without re-adjusting parameters of the image recognition model or re-training the model.

Means to Accomplish the Task

An aspect of the present invention provides a monitoring device comprising a processor, wherein the processor is configured to: acquire a camera image, an image shot by a camera, of a no-entry zone, in which vehicles can travel, and a platform zone, in which passengers can board and exit vehicles; detect an intrusion of a person into the no-entry zone based on the camera image; and instruct the monitoring device to issue an alert of the person's intrusion, wherein the processor is further configured to: perform a first operation for detecting a person intruding from the platform zone into the no-entry zone based on the camera image; perform a second operation for determining whether or not a vehicle is present in the no-entry zone based on the camera image; and determine whether an alert needs to be issued or not based on a detection result of the first operation and a determination result of the second operation, wherein a region which the camera can shoot is determined as a shooting region of the camera, and wherein, when a deviation of the shooting region occurs such that a current shooting region deviates from an original shooting region, the processor performs an image conversion operation for converting a current camera image of the current shooting region to a converted camera image, which is an image that would be captured by the camera with the original shooting region, and uses the converted camera image as a basis for the first and second operations.

Another aspect of the present invention provides a monitoring system comprising: the monitoring device; a camera for capturing an image of the no-entry zone and the platform zone; and an alerting device for performing a predetermined alert operation in response to instructions from the monitoring device.

Effect of the Invention

According to the present invention, an image conversion operation can be performed to convert an image of a current shooting region captured by a camera to a converted image, which is an image that would be captured by the camera with an original shooting region. Thus, even when there is a deviation of a shooting region of a camera, if the deviation is within an acceptable level, an accurate vehicle detection using an image recognition model can be performed without the inconvenience of re-adjusting parameters of the image recognition model or re-training the model.

BRIEF DESCRIPTION OF THE DRAWINGS

FIG. 10(A) and FIG. 10(B) are explanatory diagrams showing examples of status of the shooting region of a camera, and FIG. 10(A) shows a status in which a deviation of the shooting region is within an acceptable level, and FIG. 10(B) shows a status in which a deviation of the shooting region exceeds the acceptable level.

DESCRIPTION OF THE PREFERRED EMBODIMENT(S)

A first aspect of the present invention made to achieve the above-described object is a monitoring device comprising a processor, wherein the processor is configured to: acquire a camera image, an image shot by a camera, of a no-entry zone, in which vehicles can travel, and a platform zone, in which passengers can board and exit vehicles; detect an intrusion of a person into the no-entry zone based on the camera image; and instruct the monitoring device to issue an alert of the person's intrusion, wherein the processor is further configured to: perform a first operation for detecting a person intruding from the platform zone into the no-entry zone based on the camera image; perform a second operation for determining whether or not a vehicle is present in the no-entry zone based on the camera image; and determine whether an alert needs to be issued or not based on a detection result of the first operation and a determination result of the second operation, wherein a region which the camera can shoot is determined as a shooting region of the camera, and wherein, when a deviation of the shooting region occurs such that a current shooting region deviates from an original shooting region, the processor performs an image conversion operation for converting a current camera image of the current shooting region to a converted camera image, which is an image that would be captured by the camera with the original shooting region, and uses the converted camera image as a basis for the first and second operations.

According to the present invention, an image conversion operation can be performed to convert an image of a current shooting region of a camera to a converted image, which is an image that would be captured by the camera with an original shooting region. Thus, even when there is a deviation of a shooting region of the camera, if the deviation is within an acceptable level, an accurate vehicle detection using an image recognition model can be performed without the inconvenience of re-adjusting parameters of the image recognition model or re-training the model.

A second aspect of the present invention is the monitoring device, wherein at least three reference points are determined such that the current camera image and the converted camera image include the corresponding reference points, and wherein the processor performs the image conversion operation using the reference points as reference for conversion.

In this configuration, the image conversion operation can be performed in a proper manner, which enables accurate production of the converted image.

A third aspect of the present invention is monitoring device, wherein, when performing the second operation, the processor determines whether the vehicle is present in the no-entry zone using an image recognition model, wherein the image recognition model has been trained in advance with camera images in which a vehicle is present and camera images in which a vehicle is not present.

In this configuration, an accurate image recognition model (machine learning model) is created, which enables accurate determination of the presence of a vehicle.

A fourth aspect of the present invention is the monitoring device, wherein the processor determines whether or not the deviation between the current shooting region and the original shooting region is within a predetermined acceptable level, and wherein, when the deviation is within the acceptable level, the processor performs the image conversion operation and continues to perform the first operation, whereas, when the deviation exceeds the acceptable level, the processor alerts staff that the first operation cannot be continued.

In this configuration, when a deviation of the shooting region of a camera exceeds an acceptable level, the device alerts staff that the intruder detection operation cannot be continued. As a result, a maintenance worker can promptly begin a maintenance work involving adjustment of the condition of a camera, thereby preventing a status in which the intruder detection operation is not properly performed from being left unadjusted.

A fifth aspect of the present invention is a monitoring system comprising: the monitoring device; a camera for capturing an image of the no-entry zone and the platform zone; and an alerting device for performing a predetermined alert operation in response to instructions from the monitoring device.

In this configuration, similarly to the first aspect, even when there is a deviation of a shooting region of a camera, if the deviation is within an acceptable level, an accurate vehicle detection using an image recognition model can be performed without re-adjusting parameters of the image recognition model or re-training the model.

DESCRIPTION OF THE PREFERRED EMBODIMENT(S)

Embodiments of the present invention will be described below with reference to the drawings.

First Embodiment

Figure 1:
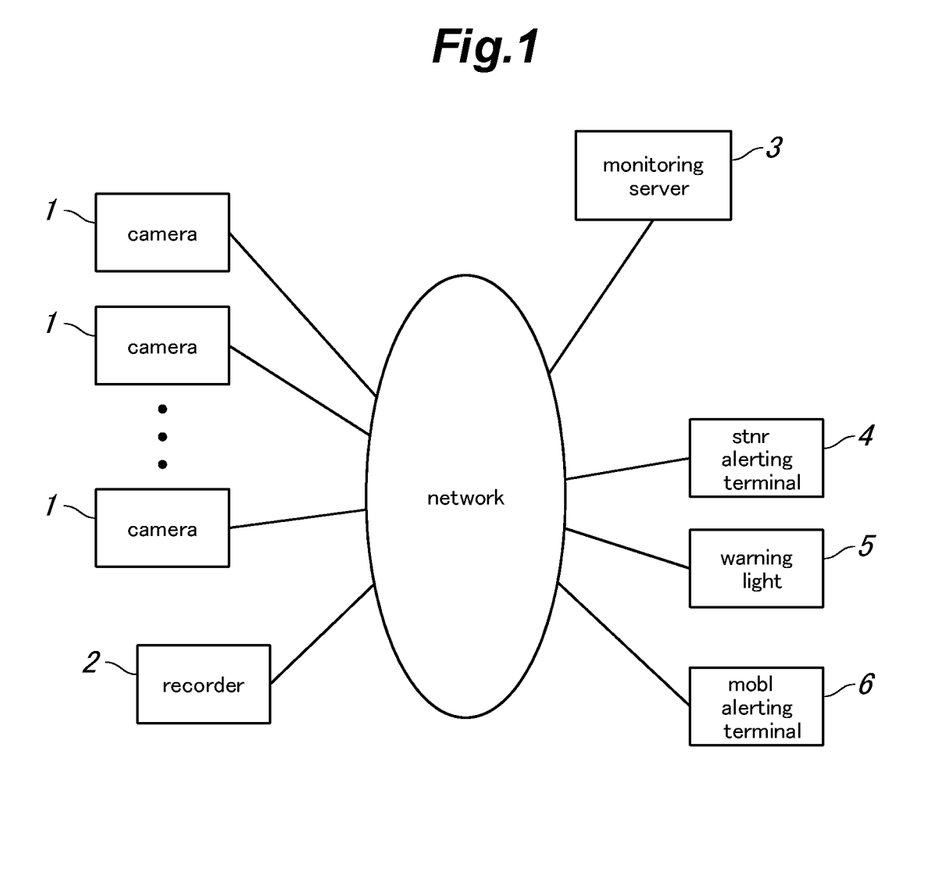
FIG. 1 is a diagram showing an overall configuration of a monitoring system according to a first embodiment of the present invention.

FIG. 1 is a diagram showing an overall configuration of a monitoring system according to a first embodiment of the present invention.

The monitoring system is configured to detect a person who has fallen off a platform at a train station (faller), and alert station staff of the fall accident. The monitoring system includes cameras 1, a recorder 2 (recording device), a monitoring server 3 (monitoring device), a stationary alerting terminal 4 (alerting device), a warning light 5 (alerting device), and a mobile alerting terminal 6 (alerting device). The cameras 1, the recorder 2, the monitoring server 3, the stationary alerting terminal 4, the warning light 5, and the mobile alerting terminal 6 are connected to each other via a network.

Each camera 1 is installed for a corresponding predetermined monitoring area in the station. A camera 1 captures camera images (images captured by the camera) of a monitored area including a platform and tracks along the platform. A camera 1 transmits a camera image of a monitored area, to the recorder 2 and/or the monitoring server 3 via the network.

The recorder 2 acquires camera images from the cameras 1 and stores the acquired camera images therein.

The monitoring server 3 is installed in a machine room in the station or a data center. The monitoring server 3 acquires camera images from the cameras 1 and performs an operation for detecting a faller i.e., a person who has fallen off a platform to the tracks (fall detection operation). When detecting such a faller, the monitoring server 3 alerts station staff of the fall accident. Specifically, the monitoring server 3 instructs the stationary alerting terminal 4, the warning light 5, and the mobile alerting terminal 6 to perform predetermined alert operations. The monitoring server 3 may be implemented by using a cloud computer.

The stationary alerting terminal 4 is installed in an office, or any other suitable place. The stationary alerting terminal 4 can be implemented by installing an application for fall accident alert on a personal computer (PC). In response to instructions from the monitoring server 3, the stationary alerting terminal 4 displays an alert screen as an alerting operation to notify station staff of a faller person.

The warning light 5 is installed in an office or any other suitable place. In response to instructions from the monitoring server 3, the warning light 5 lights a lamp and outputs an alarm sound as an alert operation to notify station staff that a faller is present.

The mobile alerting terminal 6 is a mobile terminal such as a smart phone or a tablet terminal. The mobile alerting terminal 6 is carried by a station staff member who can rush to a fall accident scene and take necessary measures. In response to instructions from the monitoring server 3, the mobile alerting terminal 6 displays an alarm screen and outputs alarm sounds and vibrations to notify station staff that a faller is present.

In the present embodiment, the system is configured to detect an accident in a railway station in which a person falls off a platform onto tracks and notify staff of the accident. However, use of the system is not limited to railroad stations. For example, the system may be used in an amusement park and configured to detect an accident in which a user enters (falls into) an area for attraction rides from the deck where a user can get on and off an attraction ride, and alert staff of the detected accident.

In the present embodiment, the system is configured to detect a person who has fallen off a platform onto tracks at a railroad station and notify staff of the fall accident. However, a subject to be monitored is not limited to a person. The system may be configured to detect that an object (such as a piece of baggage) has fallen off the platform onto the tracks and notify staff of the fall of the object.

Figure 2:
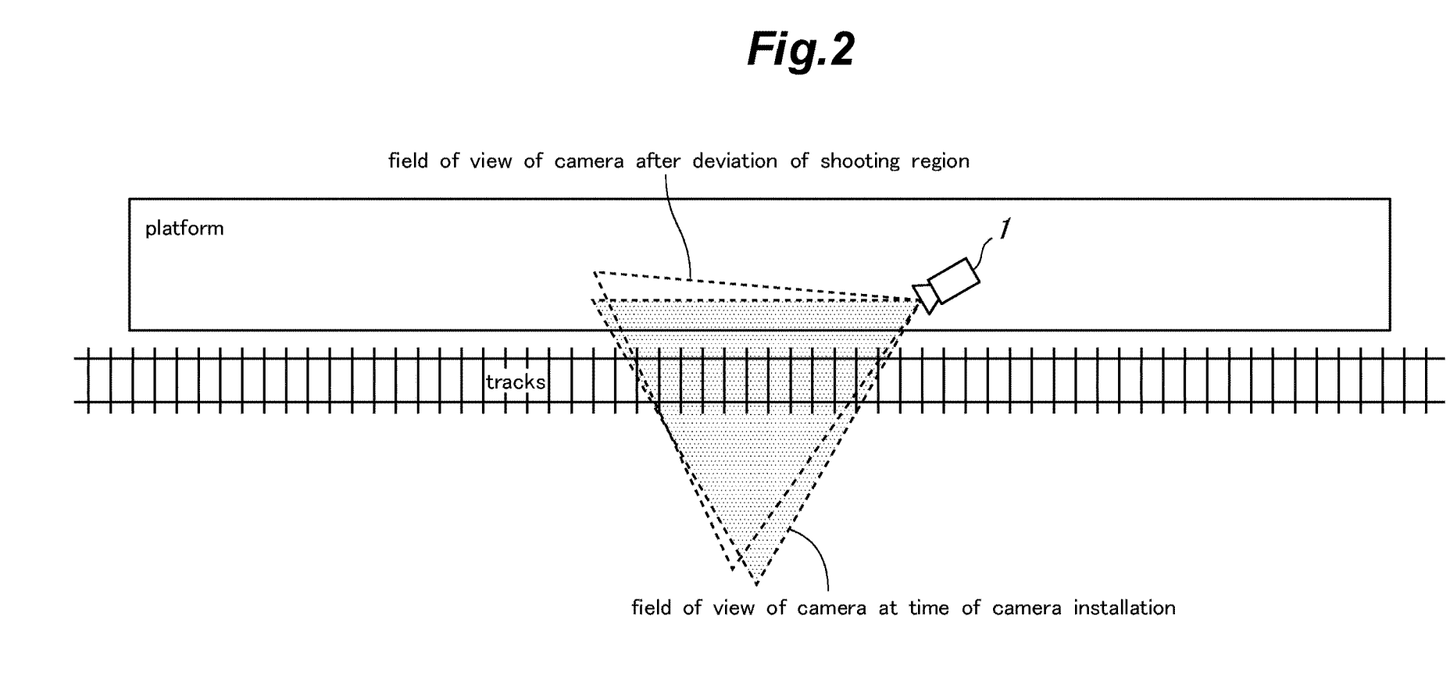
FIG. 2 is an explanatory diagram showing a situation in which a camera captures images (camera images) according to the first embodiment.
Figure 3:
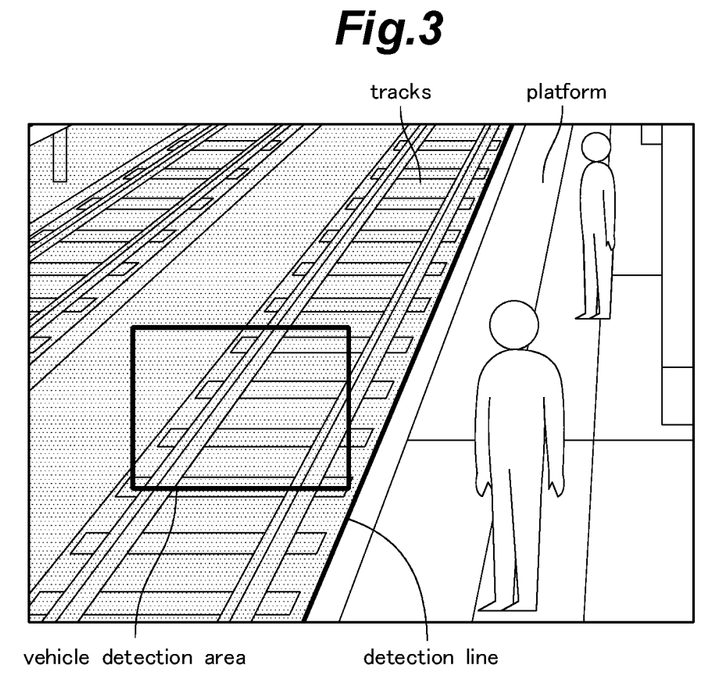
FIG. 3 is an explanatory diagram showing a detection line and a vehicle detection area determined in a camera image according to the first embodiment.
Figure 4:
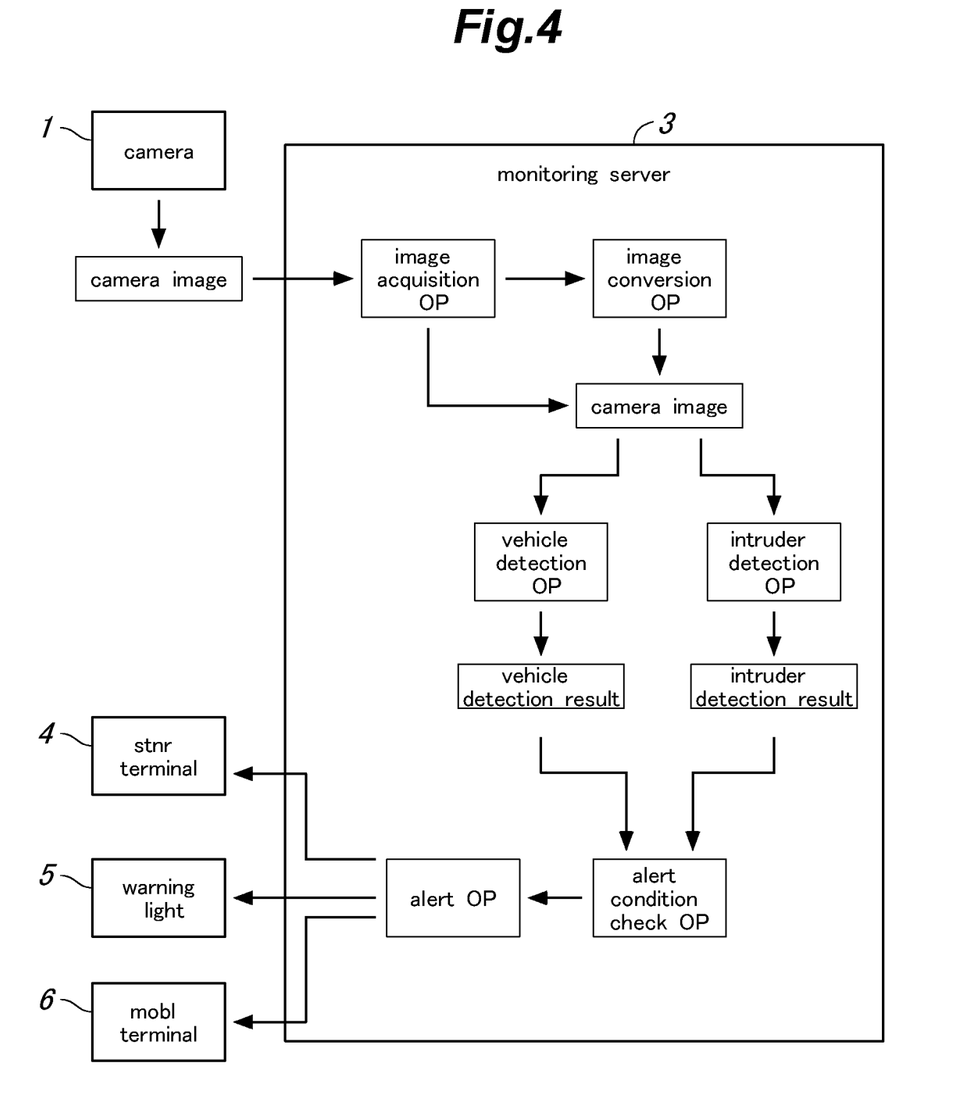
FIG. 4 is an explanatory diagram showing an outline of a fall detection operation performed by a monitoring server according to the first embodiment.

Next, a fall detection operation performed by the monitoring server 3 according to the first embodiment will be described. FIG. 2 is an explanatory diagram showing a situation in which a camera captures images. FIG. 3 is an explanatory diagram showing a detection line and a vehicle detection area set in a camera image. FIG. 4 is an explanatory diagram showing an outline of a fall detection operation performed by the monitoring server 3.

As shown in FIG. 2, each camera 1 captures an image of a platform (a platform zone) and tracks along the platform (a no-entry zone) as a camera image of a monitoring area. In some embodiments, a plurality of cameras 1 may be installed to acquire an image of a whole platform edge and the tracks along the platform, thereby eliminating blind spots in the fall detection operation for no failure of detection.

As shown in FIG. 3, the monitoring server 3 acquires camera images of the platform and the tracks along the platform. Then, based on the camera images, the monitoring server 3 detects a person (faller) who has fallen off the platform to the tracks (fall detection operation) and alerts station staff that a fall accident has occurred.

Specifically, as shown in FIG. 4, the monitoring server 3 performs an intruder detection operation (first operation) to detect a person who has moved from a platform into an area of tracks along the platform based on a camera image; performs a vehicle detection operation (second operation) to determine whether or not a train (vehicle) is on the tracks along the platform based on the camera image; and determines whether or not an alert needs to be issued based on the e results of the intruder detection operation and the vehicle detection operation.

When a train is present on the tracks along the platform, (i.e., a train stops on the tracks along the platform), or when a train is moving on the tracks along the platform, any person cannot move (fall off the platform) onto an area of the tracks. Furthermore, when a train stops on the tracks along the platform, a person who has moved from the platform into an area of the tracks is a passenger boarding the train, not a faller.

Thus, the system of the present embodiment performs the vehicle detection operation for a camera image, and when detecting a train present on the tracks along the platform, the system determines that an alert is not necessary for the camera image. In the case of a camera image for which no detected train is on tracks along a platform, the system instructs the issuance of an alert when detecting a person who has moved into an area of tracks by performing the intruder detection operation.

In the present embodiment, as shown in FIG. 3, a detection line is determined at the boundary between a platform and railroad tracks in a camera image. The system performs the intruder detection operation for detecting a person who crosses the detection line and intrudes onto the railroad tracks. Specifically, the system detects a person on the platform in a camera image (person detection operation) and determines whether or not the detected person has crossed the detection line from the platform to an area of the tracks (intrusion determination operation).

In the present embodiment, as shown in FIG. 3, a rectangular vehicle detection area is preset on a camera image for the vehicle detection operation. This vehicle detection area is determined to extend over part of the tracks in a camera image such that, when a train is present on the tracks along the platform, the vehicle detection area is covered with the train body. In the vehicle detection operation, the system cuts out the region of a vehicle detection area from a camera image to acquire an area image and determines whether or not a train is present on the tracks along the platform based on the area image.

Furthermore, the system performs the vehicle detection operation using an image recognition model (machine learning model). The system inputs an image of a vehicle detection area (area image), which has been cut out from a camera image, to the image recognition model to thereby acquire a vehicle detection result output from the image recognition model. The image recognition model for vehicle detection is created by performing preliminary supervised learning with training data including area images in which trains are on the tracks along the platform and those in which no trains are on the tracks.

As shown in FIG. 2, a deviation of a shooting region of the camera 1 is caused due to various reasons. For example, a user's incorrect operation of a pan-tilt feature of a camera 1 can cause such a deviation of the shooting region. In some cases, a vibration caused by a passing train can result in a deviation of the shooting region. In other cases, when a worker touchers or contacts a camera 1 while doing a cleaning or inspection task, the shooting region can deviate from the original shooting region.

In the present embodiment, a shooting region of a camera 1 is a region that a camera 1 can shoot, and changes depending on a direction (or posture) of the camera 1, as a shooting condition. In the case of a camera 1 with a zoom function, a shooting region of the camera changes depending on a zoom factor (i.e., a shooting range centered on the optical axis of the lens) as another shooting condition.

In this way, the shooting region of a camera can deviate from the original shooting region, causing a change in a field of view of the camera. As a result, an object included in a camera image of the vehicle detection area is changed, which causes a decrease in accuracy of the vehicle detection operation. Meanwhile, the vehicle detection operation is performed using an image recognition model (machine learning model). Thus, when a shooting region of a camera 1 is changed, an engineer needs to readjust parameters of the image recognition model, or collect training data for the changed shooting region over a certain time and retrain the model with the collected data. However, such accuracy recovery requires troublesome tasks to be done, which places a significant burden on users.

In view of such a problem, the system of the present embodiment is configured such that, as shown in FIG. 4, when a deviation of a shooting region of a camera 1 occurs, the system performs an image conversion operation to convert an image of the current shooting region to a converted image, which is an image that would be captured by the camera with an original shooting region (i.e., a shooting region at the time an image recognition model was created, such as at the time of installation of the camera), and then performs the intruder detection operation (first operation) and the vehicle detection operation (second operation) based on the converted camera image. As a result, based on accurate determination as to the presence of a train, the system can perform accurate vehicle detection through the vehicle detection operation by using the image recognition model, without re-adjusting the parameters of the model or re-training the model.

Next, the image conversion operation performed by the monitoring server 3 of the first embodiment will be described. FIG. 5 shows an outline of the image conversion operation.

For the image conversion operation, a plurality of (at least three) reference points are determined such that both a camera image of a current shooting region (current camera image) and a camera image of an original shooting region (original camera image) include the corresponding reference points, and the system performs an affine transformation on the reference points as an image conversion operation. A method of image conversion is not limited to one using an affine transformation and may be a method using any other suitable conversion technique such as perspective projection transformation.

In the present embodiment, a user or operator enters the respective positions of reference points in a camera image of a current shooting region and a camera image of an original shooting region, to thereby set the plurality of reference points. In this case, the operator selects a point at a position where a visually identifiable feature (such as a seam in a structure) is indicated in a camera image, and designates the position as a reference point. The operator may visually identify corresponding positions of a subject in current and original camera images and designate the respective positions as the same reference point.

Figure 5A:
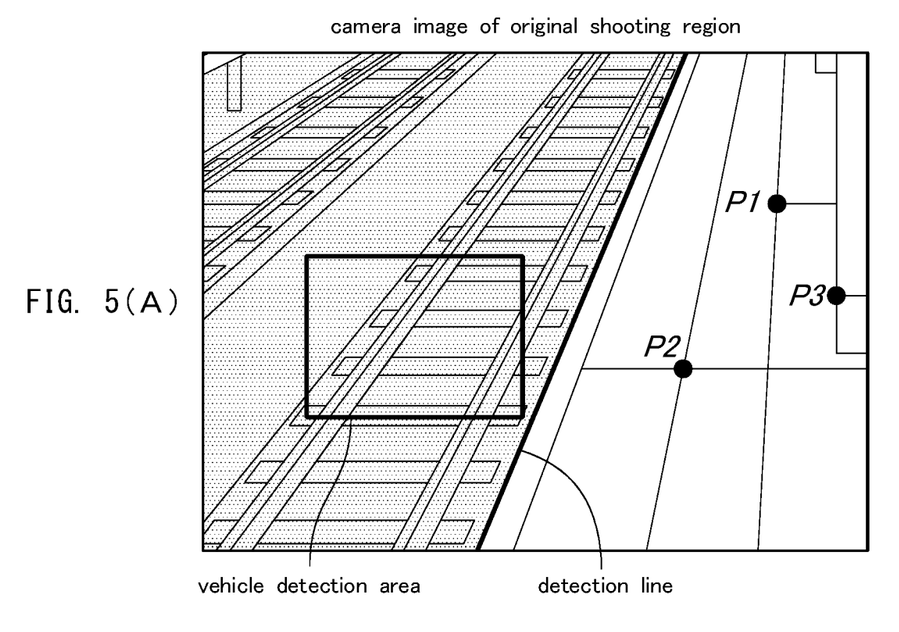
FIG. 5(A) and FIG. 5(B) are explanatory diagrams showing an outline of an image conversion operation performed by the monitoring server according to the first embodiment.
Figure 5B:
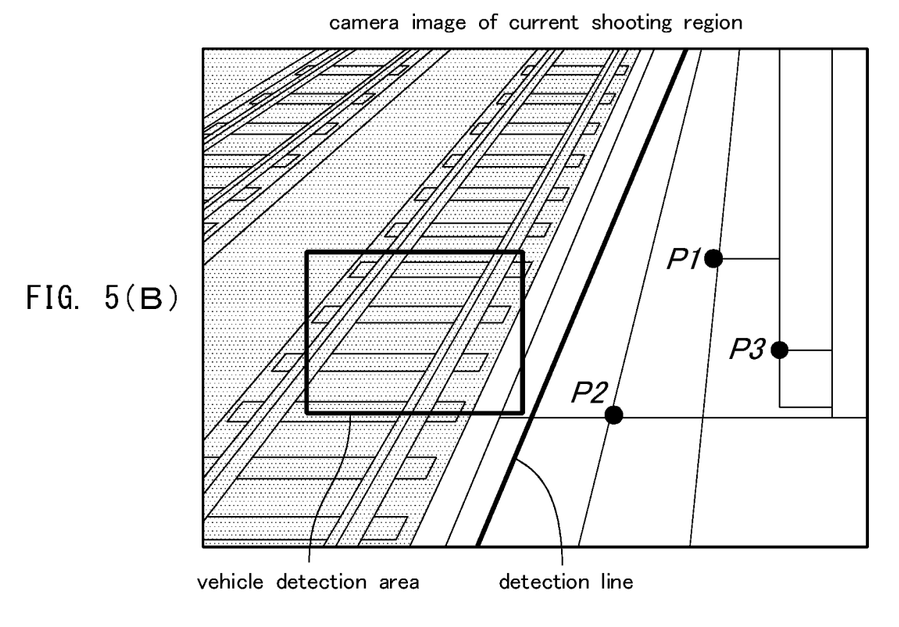

In FIG. 5, FIG. 5(A) shows a camera image of an original shooting region, and FIG. 5(B) shows a camera image of a current shooting region having a position which deviates from that of the original shooting region; that is, a deviation between the current and original images occurs.

The camera image of the original shooting region shown in FIG. 5(A) and that of the current shooting region shown in FIG. 5(B) contain respective sets of points as three reference points P1, P2, and P3. As the image conversion operation, the system performs an affine transformation on the camera image of the current shooting region shown in FIG. 5(B) such that the three reference points P1, P2, P3 in the converted camera image of the current shooting region in FIG. 5(B) can be aligned with those in the camera image of the original shooting regions in FIG. 5(A), i.e., such that the respective sets of reference points are located at the same positions with respect to each other in the converted camera image and the original camera image.

In the example shown in FIG. 5, respective sets of three reference points are determined on the camera images. In some embodiments, four or more reference points may be set on the camera images. In this case, for example, three points in the four or more points may be used as reference points for the image conversion operation.

In the present embodiments, a user sets a reference point by selecting a visually identifiable feature point and designating it as the reference point. However, the monitoring server 3 may set a reference point by detecting a feature point in a camera image through image recognition.

Figure 6:
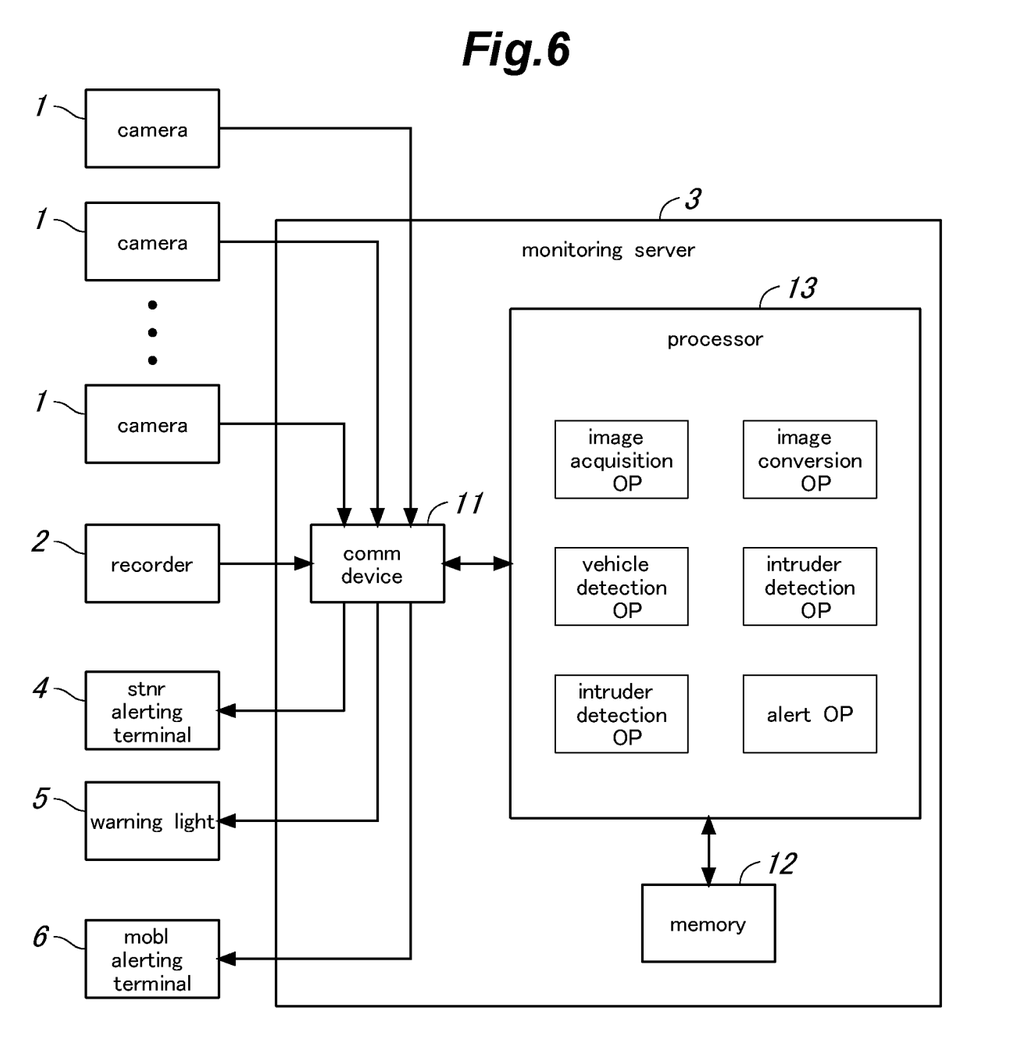
FIG. 6 is a block diagram showing a schematic configuration of the monitoring server according to the first embodiment.

Next, a schematic configuration of the monitoring server 3 of the first embodiment will be described. FIG. 6 is a block diagram showing a schematic configuration of the monitoring server 3.

The monitoring server 3 includes a communication device 11, a memory 12, and a processor 13.

The communication device 11 can communicate with cameras 1, the recorder 2, the stationary alerting terminal 4, the warning light 5, and the mobile alerting terminal 6 via the network.

Memory 12 stores programs that are executable by the processor 13 and other data.

The processor 13 performs various operations associated with fall accident detection by executing programs stored in the memory 12. In the present embodiment, the processor 13 performs an image acquisition operation, an image conversion operation, a vehicle detection operation (second operation), an intruder detection operation (first operation), an alert condition check operation, an alert operation, and other operations.

In the image acquisition operation, the processor 13 acquires a camera image from each camera 1 using the communication device 11. A camera 1 transmits a camera image of a monitoring area at a predetermined frame rate (e.g., 5 fps).

In the image conversion operation, the processor 13 converts a camera image of a current shooting region to a converted camera image, which is an image that would be captured by a camera with the original shooting region (i.e., a shooting region at the time an image recognition model was created, such as at the time of installation of the camera). Specifically, reference points are determined such that a camera image of a current shooting region (current camera image) and a camera image of an original shooting region (original camera image) include the respective sets of points corresponding to reference points, and the system performs an affine transformation on the reference points, thereby converting the current camera image to a converted camera image that approximates an image that would be captured by a camera with the original shooting region. A technique used in a method of image conversion is not limited to an affine transformation and may be any other suitable technique such as a perspective projection transformation.

In the vehicle detection operation, the processor 13 determines whether or not a train stops (i.e., is present) on the tracks along the platform based on each camera image. When some of the camera images are subjected to the image conversion operation to provide converted camera images, the converted camera images are used in the vehicle detection operation.

In the vehicle detection operation, an image recognition model (machine learning model) for vehicle detection is used. The system cuts out an image of a vehicle detection area (area image) from a camera image, and inputs the area image to the image recognition model for vehicle detection to thereby acquire an output of the image recognition model as a vehicle detection result. The system performs the vehicle detection operation on each camera image separately and acquires a corresponding vehicle detection result for the camera image.

The system may use an image recognition model that outputs a reliability score representing the reliability of an image recognition result, as a vehicle detection result, and compares the reliability score to a predetermined threshold value to acquire a vehicle detection result indicating whether or not a train stops on the tracks along the platform.

In the intruder detection operation, the processor 13 detects an intruder, i.e., a person who has crossed the detection line and entered an area of the railroad tracks based on each camera image. When some of the camera images are subjected to the image conversion operation to provide converted camera images, the converted camera images are used in the intruder detection operation.

In the intruder detection operation, the processor 13 first detects a person on the platform from a camera image (person detection operation). Next, based on a detection result of the person detection operation, the processor 13 determines whether or not the detected person has moved across the detection line from the platform to an area of the tracks (intrusion determination operation). The system performs the intruder detection operation separately on each camera image and acquires a corresponding person detection result for the camera image.

In the alert condition check operation, the processor 13 determines whether or not an alert is needed to be issued to notify staff of occurrence of a fall accident based on a person detection result and a vehicle detection result for each camera image, acquired in the intruder detection operation and the vehicle detection operation, respectively.

When determining that there is a person who has entered the area of tracks, but no train detected for a camera image, the system determines that the person is a faller (a person who has fallen off the platform) and that an alert to station staff needs to be issued. When determining that there is a person who has entered the area of tracks, but a train is present along the platform, the system determines that the person is a passenger boarding the train and that no alert to station staff is needed.

In the alert operation, the processor 13 instructs terminals or other devices to perform an alert operation to station staff according to a result of the alert condition check operation. Specifically, the processor 13 causes each of the stationary alerting terminal 4, the warning light 5, and the mobile alerting terminal 6 to perform an alert operation to notify station staff of occurrence of a fall accident. The system has a mask function for the alert operation; that is, the system stops the alert operation during a time period(s) designated by an administrator, such as a time period during which there is no service of trains.

Figure 7:
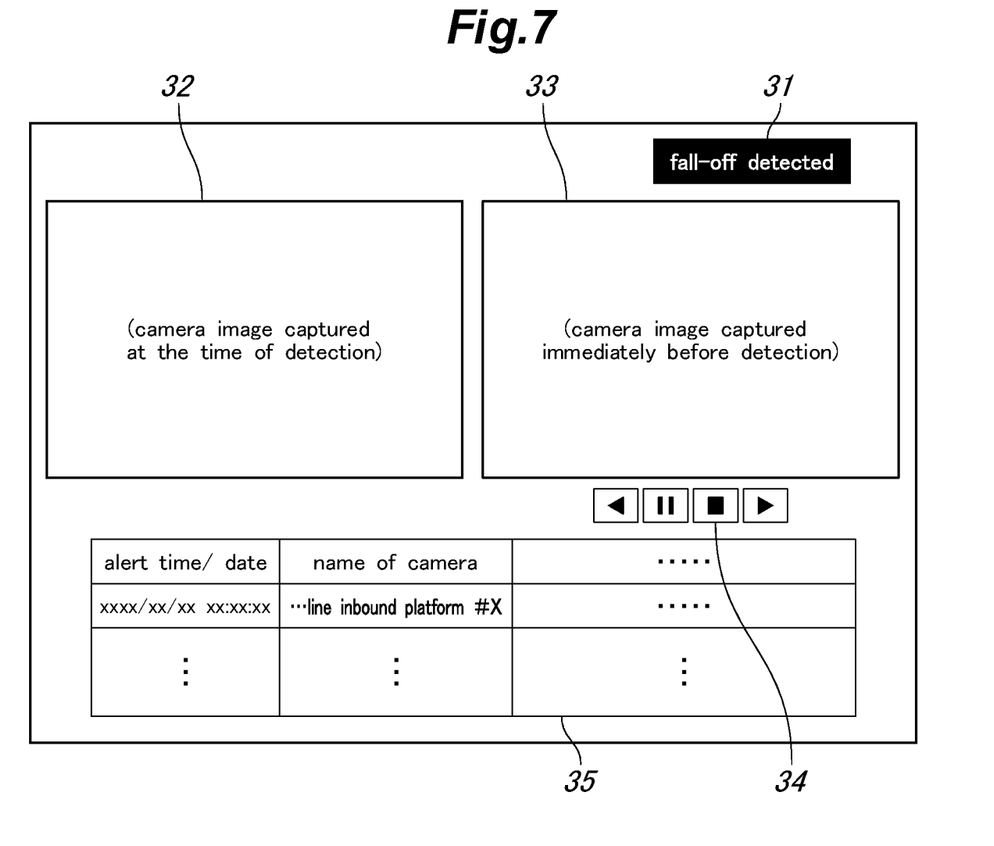
FIG. 7 is an explanatory diagram showing an alert screen displayed on a stationary alerting terminal according to the first embodiment.

Next, an alert screen displayed on the stationary alerting terminal 4 according to the first embodiment will be described. FIG. 7 is an explanatory diagram showing an alert screen.

In response to instructions from the monitoring server 3, the stationary alerting terminal 4 displays the alerting screen as an action to notify station staff of occurrence of a fall accident.

The alerting screen displays an alarm symbol 31 indicating that an alert signaling a detection of fall is being issued.

The alerting screen includes a first camera image section 32 and a second camera image section 33. The first camera image section 32 displays a camera image captured at a fall detection time, i.e., a time of detection of a person's fall onto the tracks. The second camera image section 33 displays a camera image captured at a predetermined time prior to the fall detection time. Displayed in the first camera image section 32 and the second camera image section 33 in the alerting screen are images that have been recorded and stored by the recorder 2 and are acquired therefrom. In the first camera image section 32, a camera image is displayed as a still image. In the second camera image section 33, a camera image is displayed as a moving image that is played back when a station staff member operates a control panel 34. The first camera image section 32 allows station staff to check a situation immediately after a person's fall. The second camera image section 33 allows station staff to check situations immediately before and during the person's fall.

The alerting screen also includes a log record section 35. The log record section 35 displays a list of detected fall events (fall accident) in the past. Specifically, the displayed list indicates a date and time and a camera ID for each fall event. When staff operates the alerting screen to select one event displayed in the log record section 35, the first camera image section 32 and the second camera image section 33 display camera images of the selected fall event. The system may be further configured to allow staff to enter search criteria for extraction of fall events on a log search screen (not shown), then select a fall event from the extracted fall events, and check situations of the selected fall event from camera images displayed on the alerting screen.

When the alerting screen is displayed at the stationary alerting terminal 4 as described above, the warning light 5 and the mobile alerting terminal 6 perform the respective predetermined alerting operations according to instructions from the monitoring server 3. The warning light 5 puts the light and outputs an alarm sound as outputting an alarm sound as the alerting operation to notify station staff of occurrence of a fall accident. The mobile alerting terminal 6 displays an alerting screen and outputs an alarm sound and vibration as the alerting operation to notify station staff of a fall accident. The alerting screen of the mobile alerting terminal 6 may display a camera image at the time of detection of a person entering an area of the railway tracks.

Figure 8:
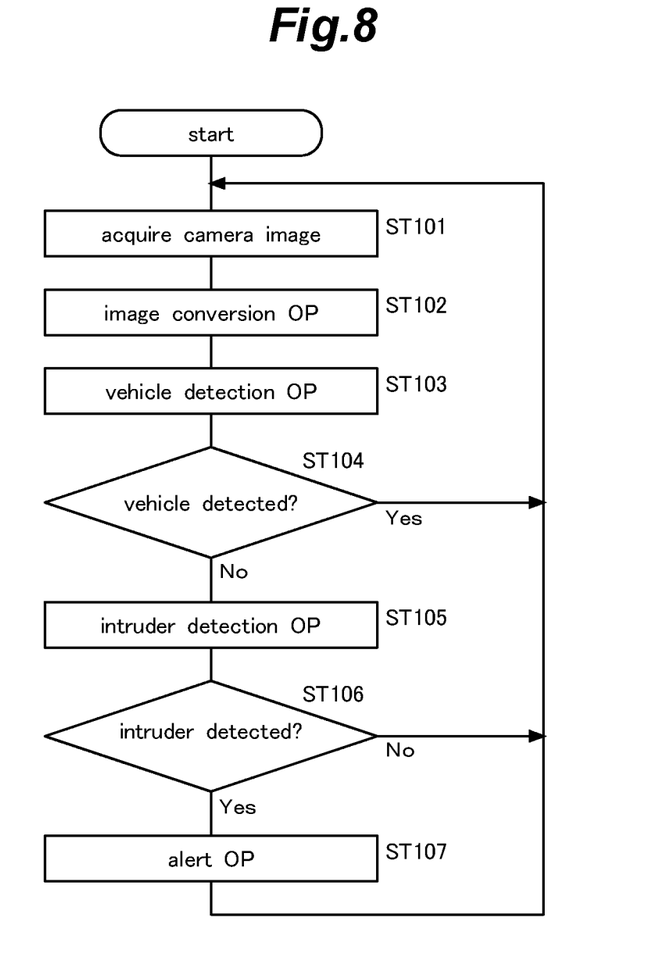
FIG. 8 is a flowchart showing an operation procedure of operations performed by the monitoring server.

Next, an operation procedure of operations performed by the monitoring server 3 of the first embodiment will be described. FIG. 8 is a flowchart showing an operation procedure of operations performed by the monitoring server 3.

In the monitoring server 3, the processor 13 first acquires a camera image (an image captured by a camera) received from a camera 1 using the communication device 11 (ST101).

Next, when a deviation of a shooting region of the camera 1 occurs, if the deviation is within an acceptable level, the processor 13 performs the image conversion operation to convert a camera image of the current shooting region to a converted camera image, which is an image that would be captured by a camera with an original shooting region (ST102).

Next, the processor 13 performs an operation (vehicle detection operation) which involves inputting the camera image into an image recognition model for vehicle detection, to determine whether or not a train is present on the tracks along the platform (ST103).

Next, when a result of the vehicle detection operation shows that no train is present (No in ST104), the processor 13 performs an intruder detection operation; that is, an operation for determining whether or not there is a detected person who has crossed a detection line and entered an area of the railway tracks (i.e., an intruder) (ST105).

Next, when a result of the intruder detection operation shows that an intruder is present (Yes in ST106), the processor 13 performs the alert operation for alerting station staff (ST107). Specifically, the processor 13 causes each of the stationary alerting terminal 4, the warning light 5, and the mobile alerting terminal 6 to perform an alerting operation to notify station staff of occurrence of a fall accident.

With regard to a deviation of a shooting region (shooting region deviation) of a camera, when the shooting region deviation is within an acceptable level (i.e., a positional deviation of a reference point(s) is rather small), the processor 13 can properly perform the image conversion operation, which allows the fall detection operation to be continued. When the shooting region deviation exceeds the acceptable level (i.e., a positional deviation of a reference point(s) is rather large), the processor 13 cannot perform the image conversion operation properly. In the latter case, if the image conversion operation is made to continue, false alarms would occur frequently. Thus, when the shooting region deviation exceeds the acceptable level, to stop conducting the intruder detection operation is necessary.

However, even after the shooting region deviation of a camera exceeds the acceptable level, when a worker manually readjusts the condition of the camera such that the deviation becomes within the acceptable level, the system can resume the fall detection operation. In this case, although a worker needs to adjust the camera condition, the image conversion operation eliminates the need for strictly precise adjustment of the camera to the initial condition. As a result, maintenance works are made easier.

Second Embodiment

Next, a second embodiment of the present invention will be described. Except for what will be discussed here, the second embodiment is the same as the above-described first embodiment.

In the present embodiment, the monitoring server 3 determines whether or not a deviation of a shooting region deviation (shooting region deviation) of a camera 1 exceeds a predetermined acceptable level (status check operation). When the shooting region deviation of the camera 1 exceeds the acceptable level, the monitoring server 3 cannot perform the image conversion operation properly, and thus cannot continue to perform the fall detection operation. Thus, the system alerts station staff that the fall detection operation cannot be continued. When the shooting region deviation is within the acceptable level, the monitoring server 3 can perform the image conversion operation properly, and continue to perform the fall detection operation.

When alerting station staff that the intruder detection operation cannot be continued, the system allows a worker to do a maintenance work promptly by adjusting the status of the camera so that the shooting region deviation becomes within the acceptable level again. When such a maintenance work is done, the monitoring server 3 performs an operation to determine whether or not the shooting region deviation of the camera 1 is within the acceptable level (status check operation). When a result of the status check operation shows that the shooting region deviation of the camera 1 is within the acceptable level, the monitoring server 3 notifies station staff that the camera 1 is recovered to a status in which the fall detection operation can be resumed.

Figure 9:
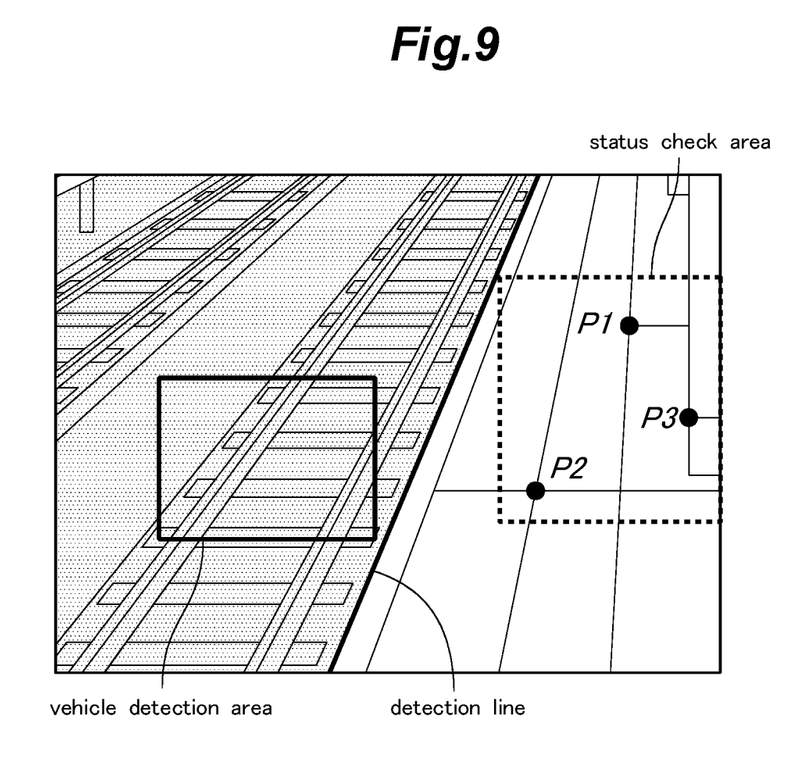
FIG. 9 is an explanatory diagram showing an outline of a status check operation performed by a monitoring server according to a second embodiment of the present invention.
Figures 10A, 10B:
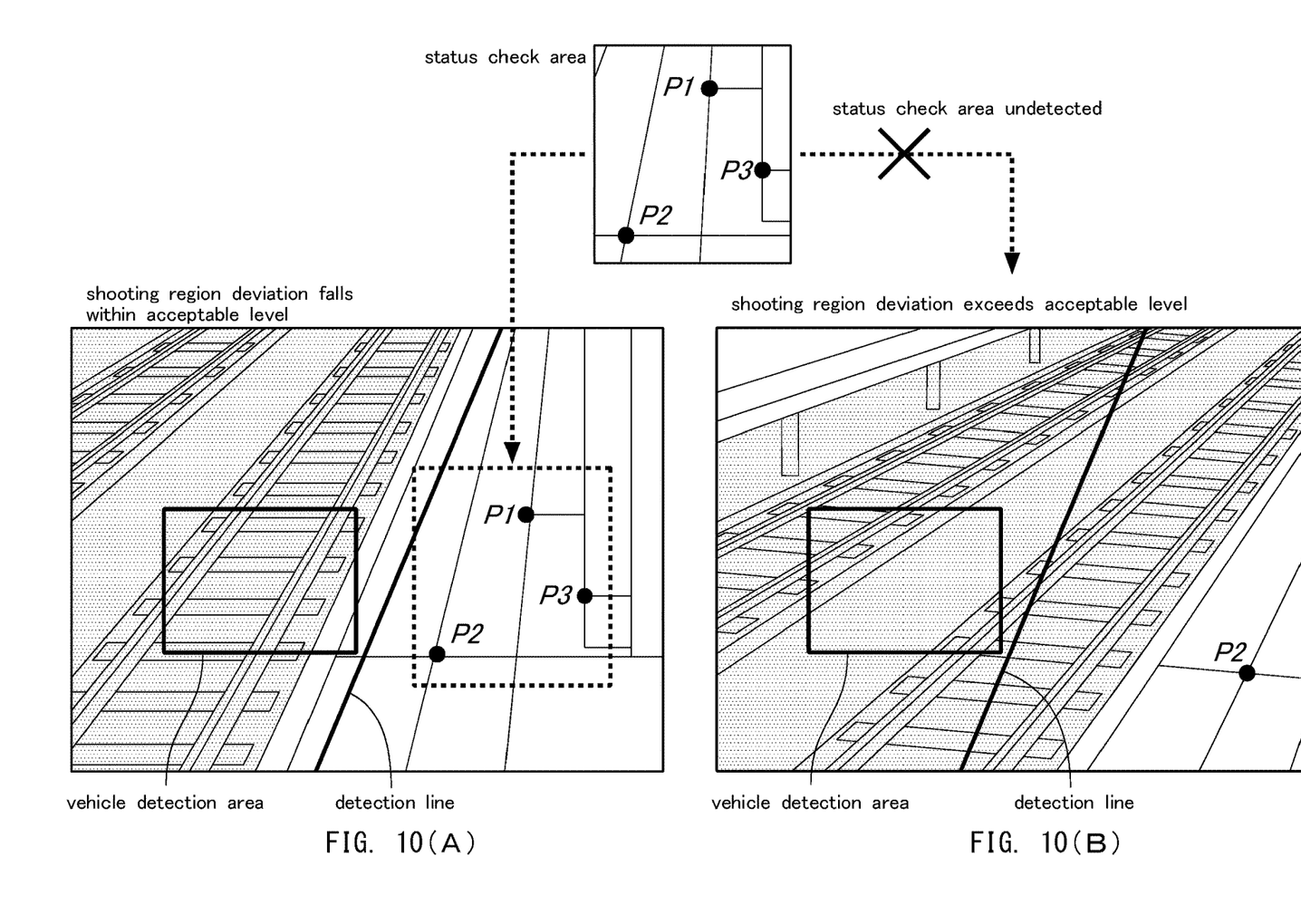

Next, a status check operation performed by the monitoring server 3 of the second embodiment will be described. FIG. 9 is an explanatory diagram showing an outline of the status check operation. FIG. 10 is an explanatory diagram showing examples of status of a camera, and FIG. 10(A) shows a status in which a deviation of the shooting region is within an acceptable level, and FIG. 10(B) shows a status in which a deviation of the shooting region exceeds the acceptable level.

As shown in FIG. 9, in the present embodiment, a plurality of reference points (at least three) are determined on a camera image of an original shooting region to be used as a basis for the image conversion operation. In addition, a status check area including a plurality of reference points, is determined on the camera image of the original shooting region to be used as a basis for determination as to whether the shooting region deviation exceeds an acceptable level or not. In the example shown in FIG. 9, three reference points P1, P2, and P3, and a status check area including these three reference points P1, P2, and P3 are in a camera image.

When a status check area cannot be detected in a camera image (i.e., the shooting region deviation of a camera 1 exceeds the acceptable level) for a predetermined time period or longer, the monitoring server 3 alerts staff that the fall detection operation cannot be continued. A status check area is often partially hidden by persons in a busy place such as a station platform. Thus, the predetermined time period is determined, e.g., one hour or more.

In detection of a status check area in a camera image, the monitoring server 3 can use an image recognition model (machine learning model) for status check. In this case, the monitoring server 3 cuts out an image of a status check area in an image of an original shooting area and uses the cut image of the status check area as input data to the image recognition model. Then, the image recognition model outputs a recognition result, i.e., a result of detection of the status check area in the image.

FIGS. 10(A) and 10(B) show examples of statuses in which a shooting region deviates from the original shooting region. In the case of FIG. 10(A), since the three reference points P1, P2, and P3 in the status check area can be detected in a camera image, the monitoring server 3 determines that a deviation of the shooting region is within an acceptable level. In the case of FIG. 10(B), since all the three reference points P1, P2, and P3 in the status check area cannot be detected in a camera image, the monitoring server 3 determines that a deviation of the shooting region exceeds the acceptable level.

In this way, in the present embodiment, when determining that the shooting region deviation exceeds an acceptable level, the monitoring server 3 alerts staff that the intruder detection operation cannot be continued. This enables a maintenance worker to promptly begin a maintenance work by adjusting involving adjustment of the condition of a camera, thereby preventing a status in which the intruder detection operation is not properly performed from being left unadjusted.

In the present embodiment, when a status check area cannot be detected in a camera image, the monitoring server 3 determines that the shooting region deviation of a camera 1 exceeds the acceptable level. However, in some cases, even in the case where a status check area is detected in a camera image, when an amount of positional change of the status check area exceeds a predetermined level, the image conversion operation cannot be properly performed. Thus, in such cases, the monitoring server 3 may determine that a deviation of the shooting region exceeds an acceptable level despite the detection of status check area.

In the above-described embodiments, a status check area is used as a basis in determination of whether a shooting region deviation is within an acceptable level or not. However, in other embodiments, some other references may be used as a basis in determination of whether a shooting region deviation is within an acceptable level or not. For example, an amount of the positional change in the center of gravity of a triangle formed by the three reference points P1, P2, and P3 may be used as a basis for determination as to whether the shooting region deviation is within an acceptable level or not.

While specific embodiments of the present invention are described herein for illustrative purposes, the present invention is not limited to these specific embodiments. It will be understood that various changes, substitutions, additions, and omissions may be made for elements and features of the embodiments within the scope of the invention. Elements and features of different embodiments may be combined with each other to yield another embodiment of the present invention.

INDUSTRIAL APPLICABILITY

A monitoring device and a monitoring system according to the present invention provide a technical advantage that, even when there is a deviation of a shooting region of a camera, if the deviation is within an acceptable level, an accurate vehicle detection using an image recognition model can be performed without re-adjusting parameters of the image recognition model or re-training the model, and are useful as a monitoring device and a monitoring system configured to: acquire a camera image, an image shot by a camera, of a no-entry zone, in which vehicles can travel, and a platform zone, in which passengers can board and exit vehicles; and detect an intrusion of a person into the no-entry zone based on the camera image; and issue an alert of the person's intrusion.

Glossary 1 camera
2 recorder
3 monitoring server (monitoring device)
4 stationary alerting terminal (alerting device)
5 warning light (alerting device)
6 mobile alerting terminal (alerting device)
11 communication device
12 memory
13 processor
P1, P2, P3 reference point

The invention claimed is:

1. A monitoring device comprising a processor,
wherein the processor is configured to:
acquire a camera image, an image shot by a camera, of a no-entry zone, in which vehicles can travel, and a platform zone, in which passengers can board and exit vehicles;
detect an intrusion of a person into the no-entry zone based on the camera image; and
instruct the monitoring device to issue an alert of the person's intrusion,
wherein the processor is further configured to:
perform a first operation for detecting a person intruding from the platform zone into the no-entry zone based on the camera image;
perform a second operation for determining whether or not a vehicle is present in the no-entry zone based on the camera image; and
determine whether an alert needs to be issued or not based on a detection result of the first operation and a determination result of the second operation,
wherein a region which the camera can shoot is determined as a shooting region of the camera, and
wherein, when a deviation of the shooting region occurs such that a current shooting region deviates from an original shooting region, the processor performs an image conversion operation for converting a current camera image of the current shooting region to a converted camera image, which is an image that would be captured by the camera with the original shooting region, and uses the converted camera image as a basis for the first and second operations.

2. The monitoring device as claimed in claim 1, wherein at least three reference points are determined such that the current camera image and the converted camera image include the corresponding reference points, and wherein the processor performs the image conversion operation using the reference points as reference for conversion.

3. The monitoring device as claimed in claim 1, wherein, when performing the second operation, the processor determines whether the vehicle is present in the no-entry zone using an image recognition model, wherein the image recognition model has been trained in advance with camera images in which a vehicle is present and camera images in which a vehicle is not present.

4. The monitoring device as claimed in claim 1, wherein the processor determines whether or not the deviation between the current shooting region and the original shooting region is within a predetermined acceptable level;

wherein, when the deviation is within the acceptable level, the processor performs the image conversion operation and continues to perform the first operation, whereas, when the deviation exceeds the acceptable level, the processor alerts staff that the first operation cannot be continued.

5. A monitoring system comprising:

the monitoring device as claimed in claim 1;

a camera for capturing an image of the no-entry zone and the platform zone; and an alerting device for performing a predetermined alert operation in response to instructions from the monitoring device.

* * * * *